United States Patent [19]

Horikawa

[11] Patent Number: 4,932,611
[45] Date of Patent: Jun. 12, 1990

[54] LEADING-EDGE FLAP SYSTEM

[75] Inventor: Makoto Horikawa, Aichi, Japan

[73] Assignee: Mitsubishi Jukogyo Kabushiki Kaisha, Tokyo, Japan

[21] Appl. No.: 317,663

[22] Filed: Mar. 1, 1989

[30] Foreign Application Priority Data

Apr. 4, 1988 [JP] Japan ................................. 63-81216

[51] Int. Cl.⁵ ........................................... B64C 13/16
[52] U.S. Cl. .................................... 244/203; 244/214;
244/76 C; 244/195; 364/442; 364/432
[58] Field of Search ............... 244/203, 213, 214, 215,
244/76 R, 76 B, 76 C, 194, 195, 191, 182;
364/442, 433, 432

[56] References Cited

U.S. PATENT DOCUMENTS

| 2,996,270 | 8/1961 | Farr et al. | 244/76 R |
| 3,940,093 | 2/1976 | Cabrieve | 244/203 |
| 4,040,580 | 8/1977 | Schwaerzler | 244/203 |
| 4,120,469 | 10/1978 | Wetermeier | 244/194 |
| 4,189,120 | 2/1980 | Wang | 244/214 |
| 4,610,213 | 9/1986 | Walker | 244/203 |
| 4,741,503 | 5/1988 | Anderson et al. | 244/203 |

FOREIGN PATENT DOCUMENTS

| 937046 | 9/1963 | United Kingdom | 244/203 |
| 2096551 | 10/1982 | United Kingdom | 244/203 |

Primary Examiner—Galen Barefoot
Attorney, Agent, or Firm—Wenderoth, Lind & Ponack

[57] ABSTRACT

In order to realize an optimum operating condition of a leading-edge flap, a wind-direction sensor and a load sensor are provided at a leading-edge flap or at each of a plurality of parts of a leading-edge flap divided along the direction of a wing span. An operational control mechanism is also provided for calculating an optimum angle of the leading-edge flap on the basis of information supplied from the wind-direction sensor and the load sensor, and for operating an actuator for varying the angle of the leading-edge flap so as to attain the calculated optimum angle. The wind-direction sensor is preferably either a hot-wire anemometer or a pressure sensor.

9 Claims, 2 Drawing Sheets

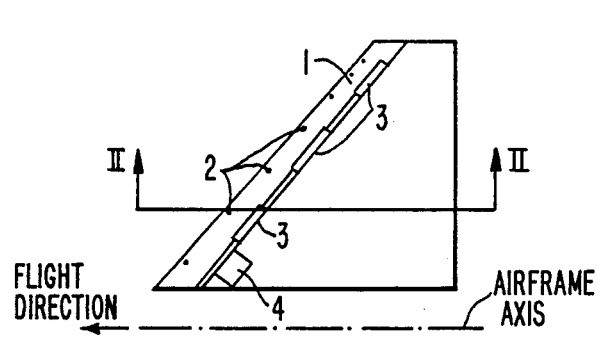
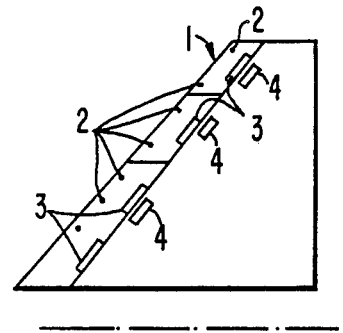
FIG.1
FIG.5
FLIGHT DIRECTION
AIRFRAME AXIS
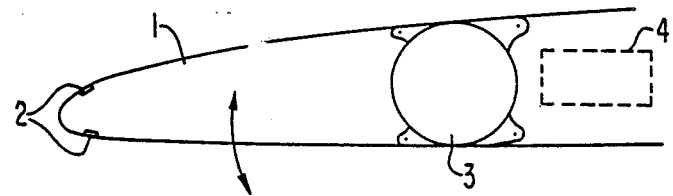
FIG.2
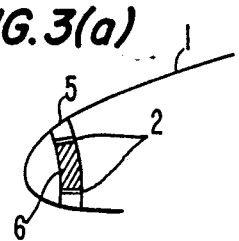
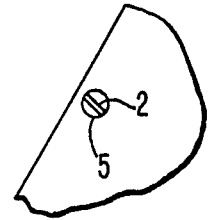
FIG.3(a)
FIG.3(b)

LEADING-EDGE FLAP SYSTEM

BACKGROUND OF THE INVENTION

1. Field of the Invention

The present invention relates to a leading-edge flap system which achieves optimization of a schedule for control of a leading-edge flap in general aircraft.

2. Description of the Prior Art

The schedule for control of a leading-edge flap angle in the prior art was determined through an extensive wind tunnel test by making use of an angle of attack ($\alpha$) and a Mach number (M) as parameters. As shown generally in FIG. 6, the schedule for control was preset in a central computer 02, and an angle of a leading-edge flap 01 was controlled by the flight conditions ($\alpha$, M) via a drive unit 03 and an actuator 04. Since a leading-edge flap 01 is normally formed as a single unit (and thus has the same flap angle) over the entire wing span, and because of the method of determination of the schedule as described above, it is not always guaranteed that optimization with respect to performance and loading is established.

More particularly, the above-described leading-edge flap system in the prior art involved the following problems to be resolved:

(1) Due to influence of the Reynolds number effect or the like which occurs in wind tunnel-testing, optimum results obtained in the wind tunnel tests will generally not correspond to optimum conditions in actual aircraft with respect to performance and loading.

(2) In the event that the schedule determined through wind tunnel testing has been found less than optimum, rectification of the schedule through a flight test is expensive and time-consuming.

(3) In a conventional airframe, the leading-edge flap is formed as a single unit along the direction of the wing span, and accordingly, in some cases, variation of airflow along the direction of the wing span cannot be accommodated in a suitable manner because the flap angle is constant along the wing span.

(4) In relation to items (1) and (2) above, extensive wind tunnel testing is necessary, thus resulting in considerable time consumption and expense.

SUMMARY OF THE INVENTION

It is therefore one object of the present invention to provide a novel leading-edge flap system, in which the aforementioned shortcomings in the prior art are obviated.

A more specific object of the present invention is to provide a leading-edge flap system in which the leading-edge flap can always be directed in the optimum direction and does not require extensive wind tunnel testing nor adjustment during flight testing.

According to one feature of the present invention, there is provided a leading-edge flap system comprising a leading-edge flap, a wind-direction sensor provided at the leading-edge flap, a load sensor for detecting a load applied to the leading-edge flap, operational control means responsive to outputs from the wind-direction sensor and the load sensor for calculating an optimum angle of the leading edge flap and controlling the angle of the leading-edge flap, and an actuator for varying the angle of the leading-edge flap on the basis of an output from the operational control means.

Preferably, the wind-direction sensor is formed of a hot-wire anemometer or a pressure sensor.

According to the present invention, the leading-edge flap system constructed in the above-described manner operates in the following fashion. In response to the wind-direction and load sensor outputs, the operational control means calculates and controls the flap angle of the leading-edge flap so that the leading-edge flap may be directed in the optimum direction with respect to the wind-direction within the limit for loading upon the leading-edge flap so as to achieve reduction of an aerodynamic resistance. If the calculated flap angle of the leading-edge flap is about to exceed the limit for loading upon the leading-edge flap, the flap angle is further controlled so as to avoid this overloading.

Owing to the above-described construction and operation of the leading-edge flap system, according to the present invention, the leading-edge flap per se is always directed in the optimum direction. Hence, wind tunnel testing and adjustment through flight testing are reduced, thus resulting in savings of time and expense. According to an additional feature of the present invention, additional optimization can be realized when the leading-edge flap is divided into a plurality of independently controlled parts. Furthermore, incidence of overloading of the flap can be reduced or eliminated.

The above-mentioned and other objects, features and advantages of the present invention will become more apparent by reference to the following description of the preferred embodiments of the invention taken in conjunction with the accompanying drawings.

BRIEF DESCRIPTION OF THE DRAWINGS

In the accompanying drawings:

FIG. 1 is a plan view of a right wing of an aircraft according to a first preferred embodiment of the present invention;

FIG. 2 is a cross-sectional view taken along line II—II in FIG. 1 of a wing which includes a first type of wind-direction sensor;

FIG. 3 shows another example of a wind-direction sensor; FIG. 3(a) being a vertical cross-sectional view of a leading-edge flap, and FIG. 3(b) being a plan view of the same;

FIG. 5 is a plan view of a right wing of an aircraft according to a second preferred embodiment of the present invention.

DESCRIPTION OF THE PREFERRED EMBODIMENTS

A first preferred embodiment of the present invention will now be described with reference to FIGS. 1 to 4. As will be seen from these figures, the leading-edge flap system according to this preferred embodiment consists of a leading-edge flap 1, a wind-direction (pressure) sensor 2, an actuator 3 for the leading-edge flap and a local computer 4. The actuator 3 contains a load sensor, and output signals of the load sensor and the wind-direction sensor 2 are applied to input terminals of the local computer 4. In this preferred embodiment, the leading-edge flap 1 along the entire wing span is formed as a single unit. The wind-direction sensor 2 consists of a pressure sensor as shown in FIG. 2 or a hot-wire anemometer as shown in FIG. 3, each of which is mounted near the tip end of the leading-edge flap and senses a wind pressure or a wind-direction at the tip end of the leading-edge flap 1. The local computer 4 controls the angle of the leading-edge flap 1 via the actuator 3 so that the pressures at the upper and lower surfaces of the tip end portion become relatively equal. Furthermore, the possibility that the load applied to the hinge of the leading-edge flap 1 may exceed a predetermined critical value may be taken into account during control of the leading-edge flap angle by the local computer 4. that is, the local computer 4 will cause adjustment of the leading-edge flap angle only within a range where the load upon the hinge does not exceed the predetermined value. It is also possible to provide that a central computer not shown in the airframe can override this load limitation.

Figure 4:
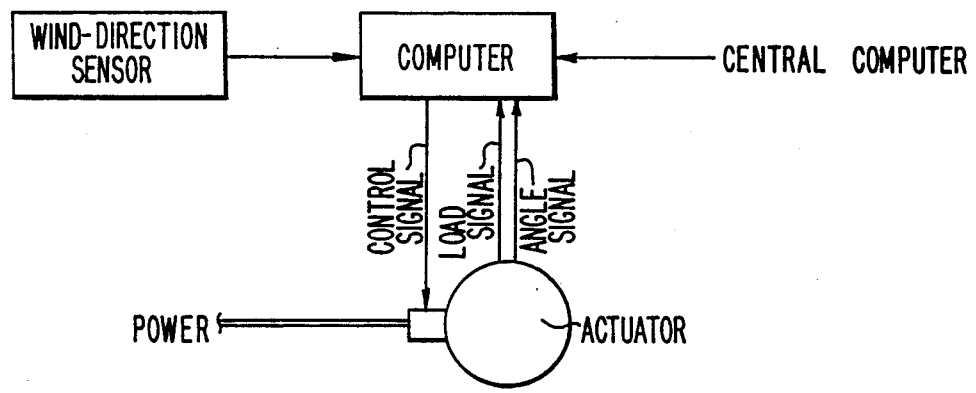
FIG. 4 is an operational system diagram of the first preferred embodiment.
Figure 6:
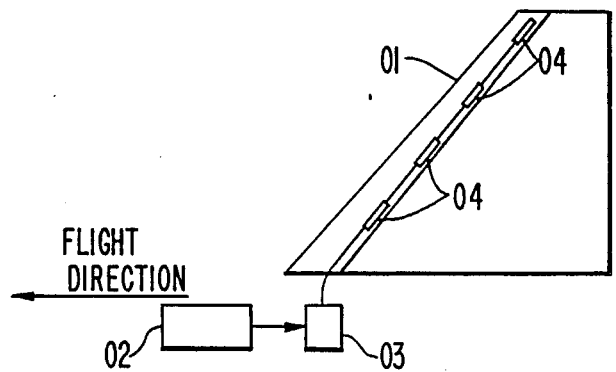
FIG. 6 is a plan view of a right wing of an aircraft associated with a leading-edge flap system in the prior art.

With regard to the wind-direction sensor 2, FIG. 2 shows the case where a pressure sensor is used as the wind-direction sensor 2. The arrangement is such that a wind-direction sensor 2 (pressure sensor) is provided at each of the upper and lower surfaces of the leading-edge flap and when the leading-edge flap 1 is actuated either upwards or downwards as shown by arrows in FIG. 2, the angles of the wind-direction sensor 2 are varied with respect to the airflow. This causes the wind pressure incident upon the respective wind-direction sensors 2 (pressure sensors) to vary in proportion with the variation in the angle of the leading-edge flap 1. Thus, on the basis of preliminary test data, the computer can calculate the angle by which the leading-edge flap 1 has been adjusted either upwards or downwards. FIG. 3 shows the case where a hot-wire anemometer is used as the wind-direction sensor 2. The hot-wire anemometer includes a bore 5 penetrated vertically through the tip end portion of the leading-edge flap 1, packing 6 filled in the middle portion of the bore 5 and hot-wires stretched over the upper surface and the lower surface, respectively, of the packing 6. Depending upon the wind-direction, the amount of cooling of the upper and lower hot-wires is varied, and the variation of the electric resistance values of the hot-wires caused by the temperature change is sensed as an electric current variation signal. Thereby, as with the case of the previously described pressure sensor, the computer can calculate the angle of adjustment of the leading-edge flap 1 on the basis of preliminary correlation test data. FIG. 4 illustrates an operation (control) system diagram of the first preferred embodiment constructed in the above-described manner.

Next, a second preferred embodiment of the present invention will be described with reference to FIG. 5. In this figure, a leading-edge flap 1 is divided into three parts along the direction of the wing span as illustrated. Each of the three divided parts includes a wind-direction sensor 2, an actuator 3 and a local computer 4 similar to those of the first preferred embodiment. Since the leading-edge flap 1 of the second preferred embodiment is constructed with three individually controlled parts, the different local airflows along the direction of the wind span are taken into account and the individual leading-edge flap parts 1 are adjusted to the optimum angle. Thus, as compared to the first preferred embodiment, the second preferred embodiment will provide flight that is closer to the ideal form. As with the first preferred embodiment, either a pressure sensor type or a hot-wire anemometer type of wind-direction sensor may be employed as the wind-direction sensor 2. It is also contemplated that other suitable types of wind-direction sensors can be employed. The operation (control) system for the leading-edge flap shown in FIG. 4 is also applicable to the three individual leading-edge flap parts of this modified embodiment.

While both the first and second preferred embodiments have been described above in association with the local computer 4, it is contemplated that if necessary, modification could be made without any inconvenience to provide a central computer in the air frame and have it, rather than a local computer, carry out every calculation and control. In addition, the number of the divided parts of the leading-edge flap 1 can be greater than or less than three. It is to be noted that in the case where both the local computer and the central computer are provided, it is contemplated that the arrangement can be such that either one of them, for instance, the central computer has the ability to override the other computer, that is, the local computer.

As will be apparent from the foregoing detailed description of the present invention, the present invention can provide the following advantages:

(1) Since the leading-edge flap per se is always directed in the optimum direction (i.e. the direction for receiving wind at its tip end plus or minus a tolerance), wind tunnel testing and adjustment through flight testing are reduced, and therefore, time and expense can be saved;

(2) In the case where the leading-edge flap is divided into a plurality of parts, additional optimization can be realized; and (3) The possibility of overloading the flap can be reduced.

While a principle of the present invention has been described above in connection with preferred embodiments of the invention, it is contemplated that many widely different embodiments of the present invention can be made without departing from the spirit of the present invention.

What is claimed is:

1. A leading-edge flap system comprising a leading-edge flap, a wind-direction sensor means provided at said leading-edge flap for detecting wind direction relative to said leading-edge flap, a load sensor means for detecting a load applied to said leading-edge flap, operational control means responsive to outputs from said wind-direction sensor means and said load sensor means for calculating an optimum angle of said leading-edge flap and controlling the angle of the leading-edge flap, and an actuator means for varying the angle of said leading-edge flap on the basis of an output from said operational control means.

2. A leading-edge flap system as claimed in claim 1, wherein said leading-edge flap is divided into a plurality of parts along the direction of a wing span, and there are provided respective wind-direction sensor means and respective actuator means corresponding to each of the respective ones of said plurality of parts of the divided leading-edge flap.

3. A leading-edge flap system as claimed in claim 1, wherein said wind-direction sensor means comprises a pressure sensor.

4. A leading-edge flap system as claimed in claim 1, wherein said wind-direction sensor means comprises a hot-wire anemometer.

5. A leading-edge flap system as claimed in claim 3, wherein said pressure sensor comprises means for detecting pressure incident on an upper surface of said leading-edge flap and means for detecting pressure incident on a lower surface of said leading-edge flap; and said operational control means controls the angle of said leading-edge flap so as to attain a predetermined difference between the pressure incident upon said upper surface of said leading-edge flap and the pressure incident on said lower surface of said leading-edge flap.

6. A leading-edge flap system as claimed in claim 5, wherein said operational control means further controls said angle of said leading-edge flap so that said load applied to said leading-edge flap is maintained within a predetermined range.

7. A leading-edge flap system as claimed in claim 4, wherein said hot-wire anemometer comprises a first hot-wire near an upper surface of said leading-edge flap, a second hot-wire near a lower surface of said leading-edge flap, means for detecting variation of the electrical resistance of said first hot-wire, and means for detecting variation of the electrical resistance of said second hot-wire; and said operational control means controls the angle of said leading edge flap so as to attain a predetermined difference between the variation of electrical resistance of said first hot-wire and the variation of electrical resistance of said second hot-wire.

8. A leading-edge flap system as claimed in claim 7, wherein said operational control means further controls said angle of said leading-edge flap so that said load applied to said leading-edge flap stays within a predetermined range.

9. A leading-edge flap system as claimed in claim 1, wherein said operational control means controls the angle of said leading-edge flap so that the wind-direction relative to said leading-edge flap is optimum, and so that said load applied to said leading-edge flap is maintained within a predetermined range.

* * * * *